United States Patent [19]

Schilling et al.

[11] 4,305,109

[45] Dec. 8, 1981

[54] SURGE ARRESTER FOR A PLURALITY OF LINES TO BE SAFEGUARDED

[75] Inventors: Guenter Schilling; Juergen Boy; Gerhard Lange; Klaus-Dietrich Heinze, all of Berlin, Fed. Rep. of Germany

[73] Assignee: Siemens Aktiengesellschaft, Berlin & Munich, Fed. Rep. of Germany

[21] Appl. No.: 123,986

[22] Filed: Feb. 25, 1980

[30] Foreign Application Priority Data

Mar. 21, 1979 [DE] Fed. Rep. of Germany ....... 2911109

[51] Int. Cl.³ .............................................. H02H 9/06
[52] U.S. Cl. ................................... 361/119; 361/127; 361/129; 361/130
[58] Field of Search .............. 361/119, 120, 124, 127, 361/129, 130

[56] References Cited

U.S. PATENT DOCUMENTS 3,710,191 1/1973 Peche .
4,009,422 2/1977 Woodfill .............................. 361/120
4,234,902 11/1980 Fujiwara et al. .................... 361/120

FOREIGN PATENT DOCUMENTS 1462168 3/1969 Fed. Rep. of Germany .
2060388 5/1977 Fed. Rep. of Germany .

Primary Examiner—Harry E. Moose, Jr.
Attorney, Agent, or Firm—Hill, Van Santen, Steadman, Chiara & Simpson

[57] ABSTRACT

A surge arrester is disclosed for a plurality of lines which are to be commonly safeguarded. In order to produce a multi-link arrester for the above application, for each of a plurality of lines which are to be safeguarded, there is provided an individual arrester to which a common arrester is connected in series. The response characteristics correspond to those of a gas discharge multi-link arrester having a common gas chamber. A capacitor is connected in parallel to the common arrester. The individual arresters and the common arrester are arranged in a beaker which is designed as a plug. A metal plate serves in the interior of the metal beaker as an electrode terminal in common to all arresters. The metal plate along with the metal beaker forms the capacitor.

7 Claims, 3 Drawing Figures

SURGE ARRESTER FOR A PLURALITY OF LINES TO BE SAFEGUARDED

BACKGROUND OF THE INVENTION

The invention relates to a surge arrester for a plurality of electrical lines which are to be commonly safeguarded.

Surge arresters are widely used, for example, in telephone and teleprinter installations in the connection lines of which excess voltages can occur. Surge arresters protect human beings and installations by limiting excess voltages to harmless values, i.e. they "divert" them. In order to effectively limit harmful excess voltages in the case of a plurality of lines in devices, it is advantageous to use a common surge arrester for this purpose. This applies for example to an amplifier provided with two incoming and two outgoing lines. When an excess voltage occurs in one of the lines it is desirable that, following the response of the surge arrester for this line, the surge arresters for the three other lines should also respond with the least possible delay. In addition transverse voltages between the individual lines must remain below a given limit value.

In order to provide double wire protection it is known, and for example described in German AS No. 20 60 388, corresponding to U.S. Pat. No. 3,710,191, incororated herein by reference, to use a so-called double link arrester. This consists of a surge arrester which is filled with an inert gas and which comprises three electrodes, i.e. two wire electrodes and one ground electrode. Between each of the wire electrodes and the ground electrode there is arranged a gas discharge link which is ignited when an excess voltage exceeds the ignition voltage. Both gas discharge links are coupled to one another via the common gas chamber. When one of the gas discharge links is ignited, the gas is ionized and consequently causes the other gas discharge link to also respond.

A four-link surge arrester which is available on the market operates in accordance with the same principle. Four pin electrodes are arranged around a central electrode in a common gas chamber. Arranging a plurality of gas discharge links in a common gas chamber involves the fundamental risk that if an individual gas discharge link is overloaded and consequently the gas chamber becomes leaky, the functioning of all the gas discharge links can be disturbed. In addition the electrode arrangement which operates in accordance with the known four-link surge arrester permits only a small electrode surface. Consequently it is difficult to keep the response d.c. voltages at constant values during the production of the arrester and during operation. In addition the possibility of applying activating masses to the electrodes is also small. Furthermore, it is difficult to apply an auxiliary ignition means in the form of a field-distorting electrode in the region of the gas discharge links, if not impossible for geometric considerations. Not least of all, in the known arrester the manner in which the pin electrode connections are established represents a mechanical risk and consequently a risk to the seal of the gas chamber.

It is further known from German OS No. 1,462,168, incorporated herein by reference for the safeguarding of several lines, to take a combination protection circuit formed out of several individual arresters.

SUMMARY OF THE INVENTION

An object of the present invention is to provide a surge arrester which guarantees the common protection of a plurality of connected lines, i.e. two or more, but does not involve the disadvantages of a common gas chamber. In particular it is also possible to achieve the values relating to response voltages, speed, loading capacity, and constancy which are technologically attainable in individual arresters.

In order to realize these objectives, in a surge arrester for a plurality of lines which are to be commonly safeguarded, the following features are proposed in accordance with the invention:

(a) each individual arrester is connected at one of its two electrode terminals to one of the lines;

(b) a common arrester connected in series to the individual arresters is connected at one of its two electrode terminals to the other electrode terminals of the individual arresters;

(c) the other electrode terminal of the common arrester carries a reference potential.

The response voltages of the common arrester and of each individual arrester compose the active response voltages. If an excess voltage which exceeds the response surge voltage of the overall surge arrester occurs on one of the connected lines, the connected individual arrester and the common arrester respond virtually simultaneously, limit the excess voltage, and virtually short-circuit the line of the reference potential except for the sum of two arc drop voltages, if the individual arresters and the common arrester are gas discharge arresters. Following this response, the other individual arresters carry the operating voltages of the connected lines, reduced by the voltage which has been limited by the common arrester, and in the case of the common gas discharge arrester by the arc drop voltage thereof. Since the response of the common arrester has considerably reduced the overall response voltage for the other lines, the other individual arresters subsequently respond even at low excess voltages which are carried on the other lines possibly due to inductive coupling or for other reasons. This ensures a common safeguarding of the participating lines and a reliable protection of the connected installations.

The present invention provides a structure which is a combined surge arrester for several lines which are to be safeguarded in common. Furthermore, the individual arresters can respond before the common arrester.

In the surge arrester of the invention, the following features are proposed:

(1) the individual arresters and the common arrester are arranged in a beaker or cup-shape which is designed as a plug;

(2) a metal plate serves in the interior of the metal beaker or cup as an electrode terminal common to all arresters; and (3) the metal plate along with the metal beaker forms the capacitor.

By means of structure design one attains without great expense the desired enlargement of the capacitance between common electrode terminal and reference potential. Therefore, it results that the common arrester never responds first. In the case of steeply rising surges, the voltage divides in inverse ratio to the capacitances lying in series before the response of the surge arrester. A large capacitance of the common arrester then signifies a high frequency short circuit, so that first the corresponding individual arrester responds. After this, almost the total voltage is present on the common arrester, which thereby also quickly responds.

An advantageous design consists in that the metal plate has the shape of a beaker or cup, the wall of which is positioned coaxially opposite to the wall of the metal beaker or cup and along with this forms the capacitor.

It is advantageous if the respone DC voltages of the individual arresters are smaller than the operating voltage of the connected line. This ensures a virtually simultaneous response of all the individual arresters and thus characteristics as displayed by a multi-link arrester with a common gas chamber. However, it is of essential importance that when individual arresters are employed, it is possible to use all the advantages of individual arresters with regard to electrode surfaces and shapes, and the associated production tolerances which influence low and constant response voltages, including the advantages of activating masses and ignition aids. It is thus advantageous if all participating arresters are gas discharge arresters. Furthermore, the series connection of two gas discharge arresters has the advantage that the erasing voltage can assume high values which cannot be reached when an individual gas discharge arrester with an activating mass is used.

If the response DC voltages of the individual arresters are to be considerably lower than the operating voltages, and if the values of the operating voltages are so low that the individual arresters must have a response DC voltage of less than approximately 70 V in order that all the individual arresters connected to the lines may respond in common, it is advantageous to use solid body arresters, in particular varistors, for the individual arresters. For technological reasons it is difficult to achieve a response DC voltage of less than approximately 70 V for gas discharge arresters. On the other hand this is easily possible in the case of solid body arresters.

In order to achieve a low response surge voltage of the series connected arresters, it is advantageous to unequally distribute a steep rise in the gradient of the excess voltage. Therefore in accordance with a development of the surge arrester corresponding to the invention, the capacitance of the common arrester differs from the capacitance of the individual arresters.

The best procedure is to provide that the capacitance of the common arrester exceeds the capacitance of the individual arresters. Disregarding a technologically feasible method of increasing the inner self capacitance, this can be effected either by connecting a capacitor in parallel to the common arrester or by a structural design of a metallic sleeve and the common electrode terminal of the individual arresters. The structural design advantageously consists in that the common electrode terminal has the shape of a beaker whose wall surface forms the capacitor together with the opposite wall surface of the metallic sleeve. The metallic sleeve carries reference potential.

In the case of surge voltages having sharply rising gradients, prior to the response of the surge arrester the voltage is split up in inverse proportion to the series connected capacitances. A large capacitance of the common arrester then means a high frequency short-circuit so that the corresponding individual arrester responds first. Then virtually the entire voltage is connected to the common arrester which consequently likewise responds rapidly.

A further development of a surge arrester corresponding to the invention is the protection of human beings and of equipment by means of a so-called fail-safe characteristic. In the case of overload a permanent short-circuit is to take place. For this purpose it is provided that in the event of overload the individual arresters receive an inner short-circuit due to the fusion of the electrode plates, and the exterior of the common arrester is provided with a biased short-circuit bridge which is supported from the exterior by a fusion pill and which short-circuits the electrodes in the event of overload.

A combined fail-safe characteristic of this kind can be achieved by the division into individual arresters as provided by the invention. The individual arresters are short-circuited rapidly and individually. The sum current flowing through the common arrester supplements the short-circuit by means of the external short-circuit via the short-circuiting bridge.

DESCRIPTION OF THE PREFERRED EMBODIMENTS

Figure 1:
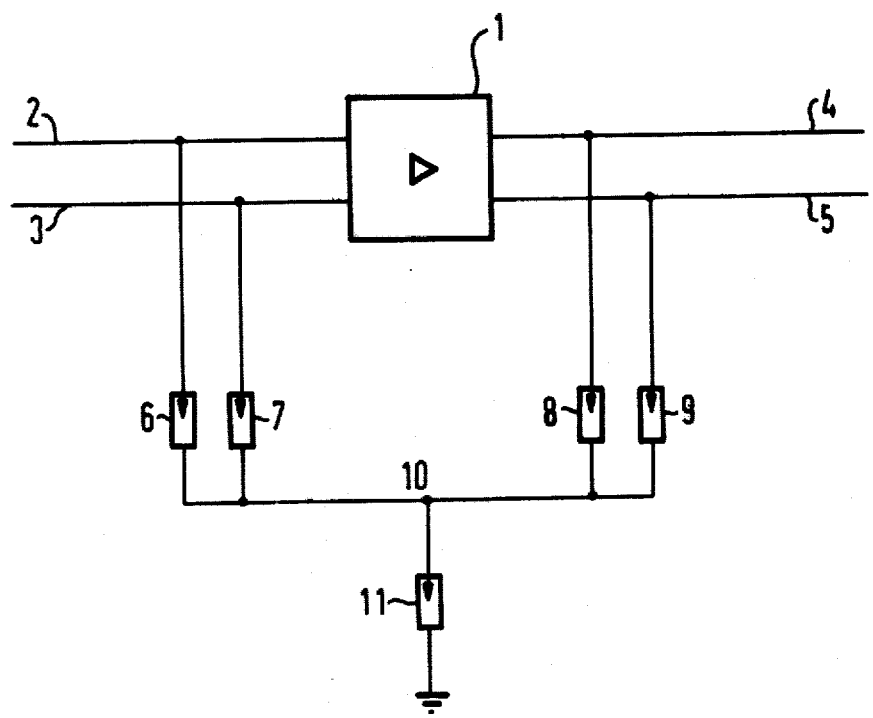
FIG. 1 is a schematic equivalent circuit diagram of 4-wire protection of an amplifier.

In FIG. 1, a four-pole amplifier is referenced 1. Two lines 2 and 3 lead to the input, whereas two lines 4 and 5 lead away from the output. From the four lines 2 to 5, one of four individual arresters 6 to 9 in each case leads to a common electrode terminal 10. Between this electrode terminal 10 and a reference potential there is connected a common arrester 11.

Figure 2:
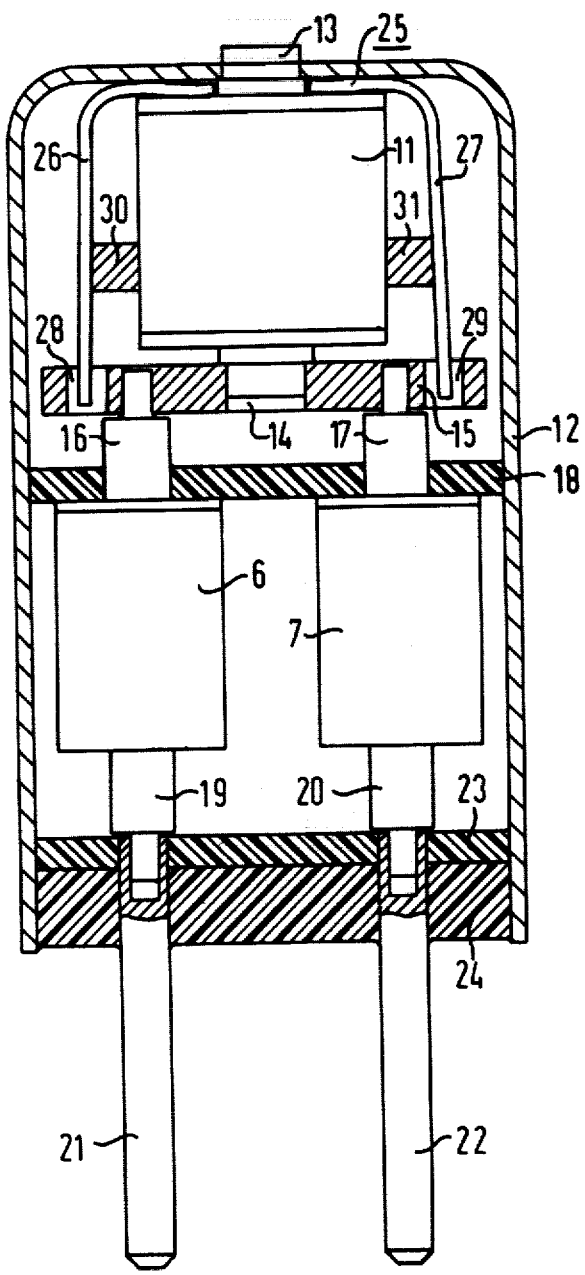
FIG. 2 illustrates a cross-sectional view of a construction of a surge arrester for four wires.

FIG. 2 illustrates a structural design of the exemplary embodiment illustrated in FIG. 1 for a surge arrester for four wires, in which however, for reasons of clarity, only two of the individual arresters have been shown. A metallic beaker 12 serves as carrier and sleeve for the surge arrester corresponding to the invention. The top the beaker 12 is provided with an opening through which projects a first electrode terminal 13 of the common arrester 11 which serves as outer terminal for the reference potential. A second electrode terminal 14 of the common arrester 11 is centrally positioned in a metal plate 15, which represents the common electrical terminal 10 for the four individual arresters 6 to 9. Only two of the individual arresters 6 to 9 have been shown, namely 6 and 7, whose first electrode terminals 16 and 17 are positioned in the metal plate 15. The individual arresters 6 to 9 are held in the beaker 12 by means of an insulating plate 8 through which are passed the electrode terminals 16, 17 and the corresponding electrode terminals of the other individual arresters 8, 9 which have not been shown. The other electrode terminals 19, 20 of the individual arresters 6, 7 (and correspondingly those of the individual arresters 8, 9) are connected to terminal pins 21, 22 which lead out of the beaker 12 through an insulating end plate 23 provided with a sealing compound 24.

The common arrester 11 and the individual arresters 6 to 9 respresent gas discharge surge arresters each having a discharge path. For example the common arrester 11 has a response DC voltage of 150 V, and the individual arresters each have a response DC voltage of 90 V.

Between the base of the beaker and the electrode 13 which passes through it of the common arrester 11, there is clamped a short-circuiting bridge 25 which extends via two arms 26 and 27 along two opposite longitudinal sides of the common arrester 11 into two openings 28, 29 of the metal plate 15, is spring biased against the insulating wall of the common arrester 11, and is maintained in this position by a fusion pill 30, 31 respectively. In the event of the response of at least one of the individual arresters 6 to 9 and the common arrester 11, if overload occurs the sum current flowing through the common arrester 11 heats the insulator wall and the fusion pills 30 and 31. When an upper limit is exceeded, the fusion pills 30 and 31 melt and cause the arms 26 and 27 of the short-circuiting bridge 25 to spring against the insulator wall. As a result the ends of the arms contact the inner walls of the openings 28, 29 in the metal plate 15 and thus short-circuit the two electrode terminals 13 and 14 of the common arrester 11.

Figure 3:
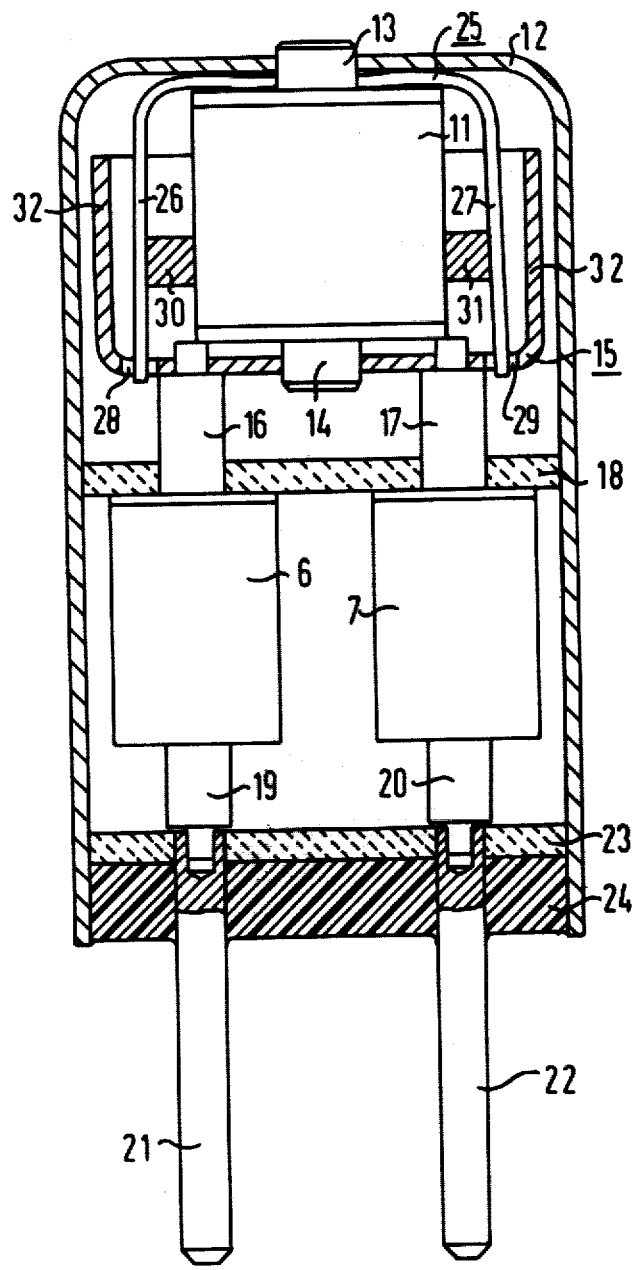
FIG. 3 illustrates in cross-section a structural further development relating to the capacitance of the common arrester.

FIG. 3 is virtually identical to FIG. 2. The positions 6 to 31 are again shown. However, the metal plate 15 for the common electrode terminal 11 has been drawn upwards in the manner of a beaker and, together with the walls 32 and the parallel part of the outer metal beaker 12, forms a capacitor which is arranged electrically parallel to the discharge path of the common arrester 11. In this way, by structural means it is possible to increase the effective voltage divider capacitance of the common arrester 11 so as to ensure a rapid initial ignition of one of the individual arresters 6 to 9.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A surge arrester for a plurality of electric lines which are to be commonly safeguarded, comprising:
    a plurality of individual arresters each connected at one of its two electrode terminals to a respective one of a plurality of electric lines;
    a common arrester connected in series to the individual arresters and connected at one of its two electrode terminals to the other electrode terminal of each of the individual arresters;
    the other electrode terminal of the common arrester being connected to a reference potential;
    the individual arresters and the common arrester being connected to the lines and reference potential via plug-type connections;
    a capacitor connected in parallel to the common arrester;
    the individual arresters and the common arrester being arranged in a metal beaker-shaped housing designed as a plug-in unit;
    a metal plate in an interior of the metal housing serving as an electrode terminal in common to all arresters; and
    the metal plate along with the metal housing forming said capacitor.

2. A surge arrester according to claim 1 wherein the metal plate is formed in a beaker-shape, and a peripheral wall of which stands coaxially opposite the wall of the metal beaker-shaped housing and with this forms the capacitor.

3. A surge arrester according to claim 1 wherein response DC voltages of the individual arresters are each smaller than the operating voltage of the respective connected line.

4. A surge arrester according to claim 1 wherein the arresters are gas discharge arresters.

5. A surge arrester according to claim 1 wherein the individual arresters are solid body varistor arresters.

6. A surge arrester according to claim 1 wherein for overload protection the common arrester carries a spring biased short-circuiting bridge which is supported away from walls of the common arrester by a fusion pill and which is arranged to short-circuit the common arrester electrode terminals in the event of overload by providing the fusion pill of a material which melts at temperatures corresponding to overload.

7. A surge arrester, comprising:
    a plurality of individual arresters each connected at one of its two electrode terminals to a respective one of a plurality of electric lines;
    a common arrester connected in series to the individual arresters and connected at one of its two electrode terminals to the other electrode terminal of each of the individual arresters;
    the other electrode terminal of the common arrester being connected to a reference potential;
    the individual arresters and the common arrester being arranged in a metal beaker-shaped housing;
    a metal plate in an interior of the metal housing serving as an electrode terminal in common to all arresters; and
    the metal plate having a portion cooperating with the metal housing and forming a capacitor in parallel to the common arrester which is greater than an effective capacitance in parallel with the individual arresters such that a capacitance voltage divider is formed which causes ignition of at least one of the individual arresters prior to ignition of the common arrester.

* * * * *